(No Model.) 4 Sheets—Sheet 1.

J. BUCK.
MACHINE FOR CUTTING MITER AND BEVEL GEAR WHEELS.

No. 565,834. Patented Aug. 11, 1896.

Witnesses.
Frank N. Hume.
Robert Everett.

Inventor
John Buck.
By James L. Norris.
Atty.

(No Model.) 4 Sheets—Sheet 2.
J. BUCK.
MACHINE FOR CUTTING MITER AND BEVEL GEAR WHEELS.
No. 565,834. Patented Aug. 11, 1896.

Witnesses.
Frank N. Hunn.
Robert Everett.

Inventor.
John Buck.
By James L. Norris.
Atty.

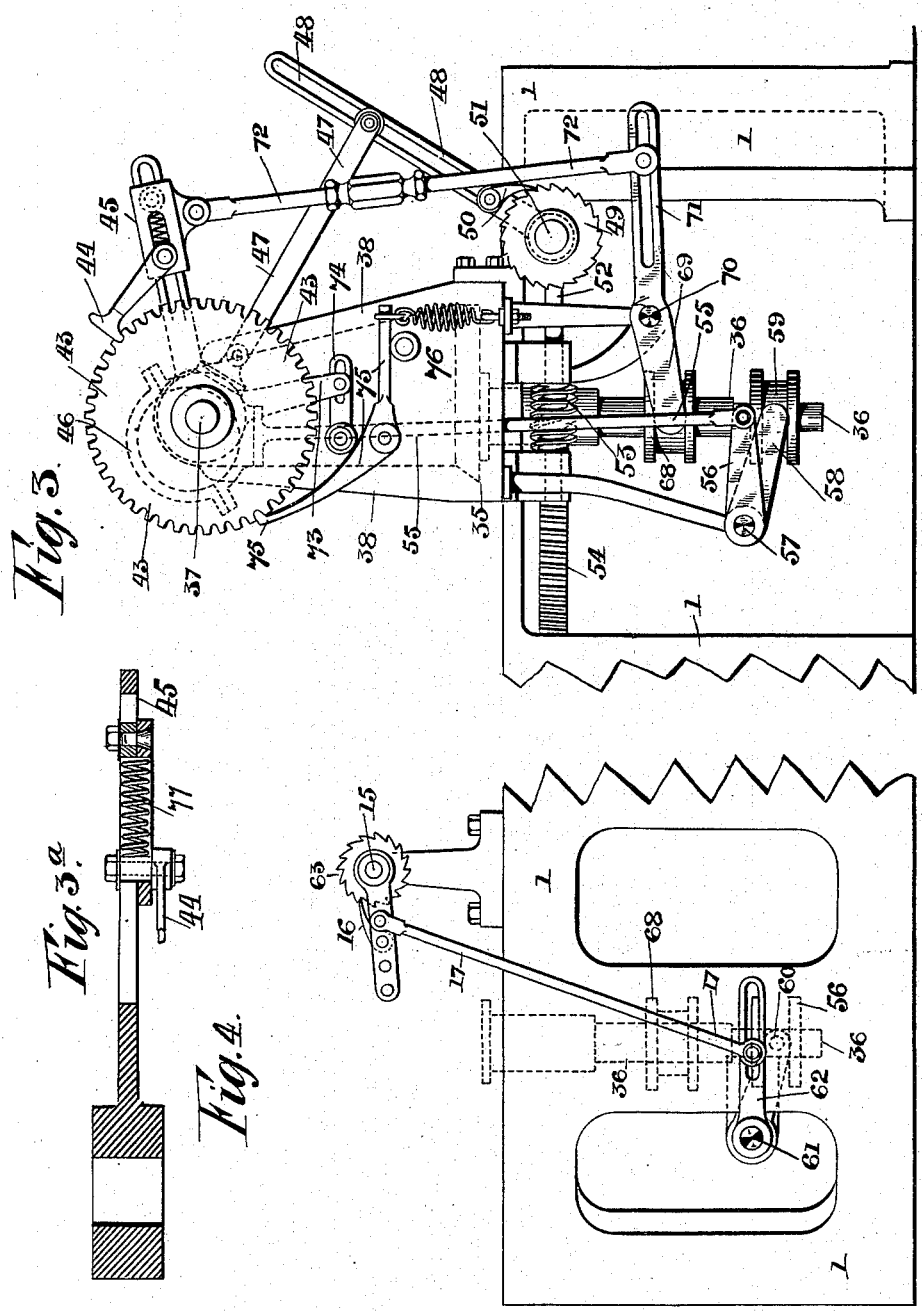

(No Model.) 4 Sheets—Sheet 4.
J. BUCK.
MACHINE FOR CUTTING MITER AND BEVEL GEAR WHEELS.
No. 565,834. Patented Aug. 11, 1896.
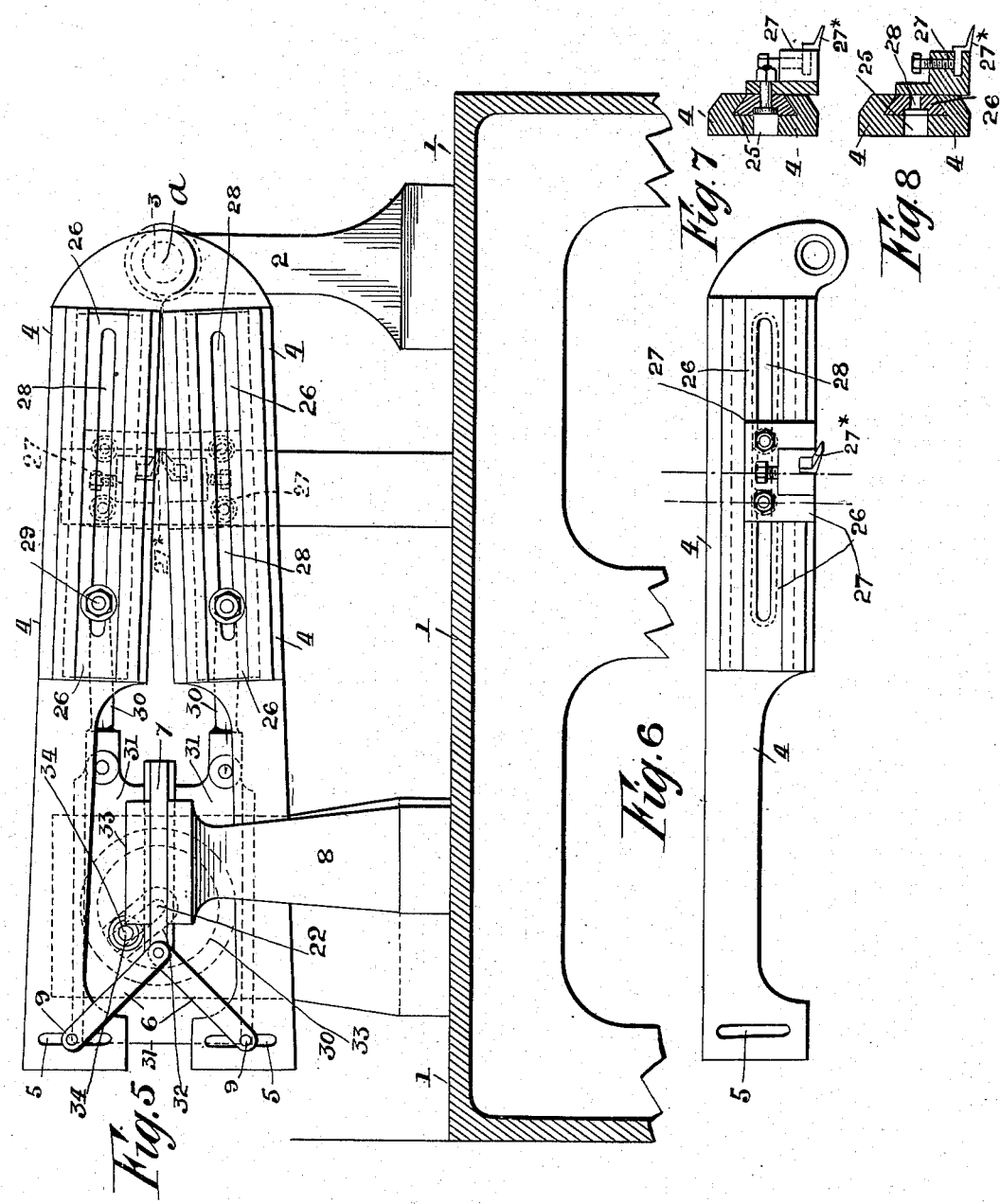
Witnesses.
Frank N. Hume
Robert Everett
Inventor.
John Buck,
By James L. Norris.
Atty.

UNITED STATES PATENT OFFICE.

JOHN BUCK, OF LINCOLN, ENGLAND.

MACHINE FOR CUTTING MITER AND BEVEL GEAR-WHEELS.

SPECIFICATION forming part of Letters Patent No. 565,834, dated August 11, 1896.

Application filed February 1, 1896. Serial No. 577,735. (No model.) Patented in England May 1, 1895, No. 8,651.

*To all whom it may concern:*

Be it known that I, JOHN BUCK, a subject of the Queen of Great Britain, residing at 47 Boultham Avenue, Lincoln, in the county of Lincoln, England, have invented certain new and useful Improvements in Machines for Cutting Miter and Bevel Gear-Wheels, (patented in Great Britain, No. 8,651, dated May 1, 1895,) of which the following is a specification.

My invention relates to a machine for cutting miter and bevel wheels in such a way that each tooth of such wheels shall be of true form throughout its whole length.

Instead of using a revolving cutter or milling-tool, as in other machines, I use two planing-tools, one each side of the tooth. These tools are fixed to slides which work in inclined grooves, the continuation of which grooves points to the theoretical point of intersection of the center lines of the teeth of one bevel-wheel with the center line of the teeth of the wheel gearing with it.

Suitable means are provided for making the feed of the cutting-tools and the rotation of the wheel being cut quite automatic.

My invention will be clearly understood by reference to the annexed drawings.

Figure 1:
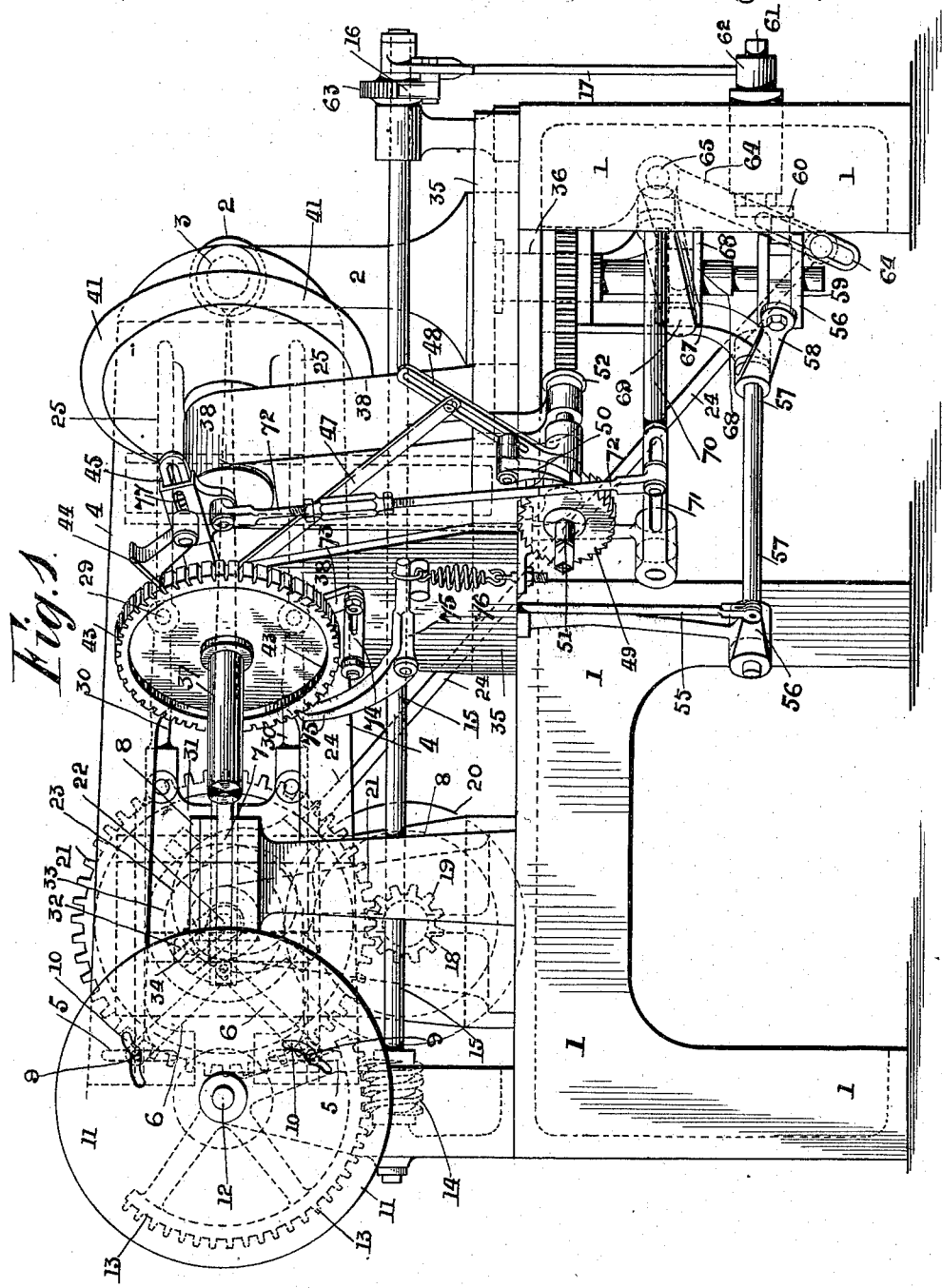
Figure 2:
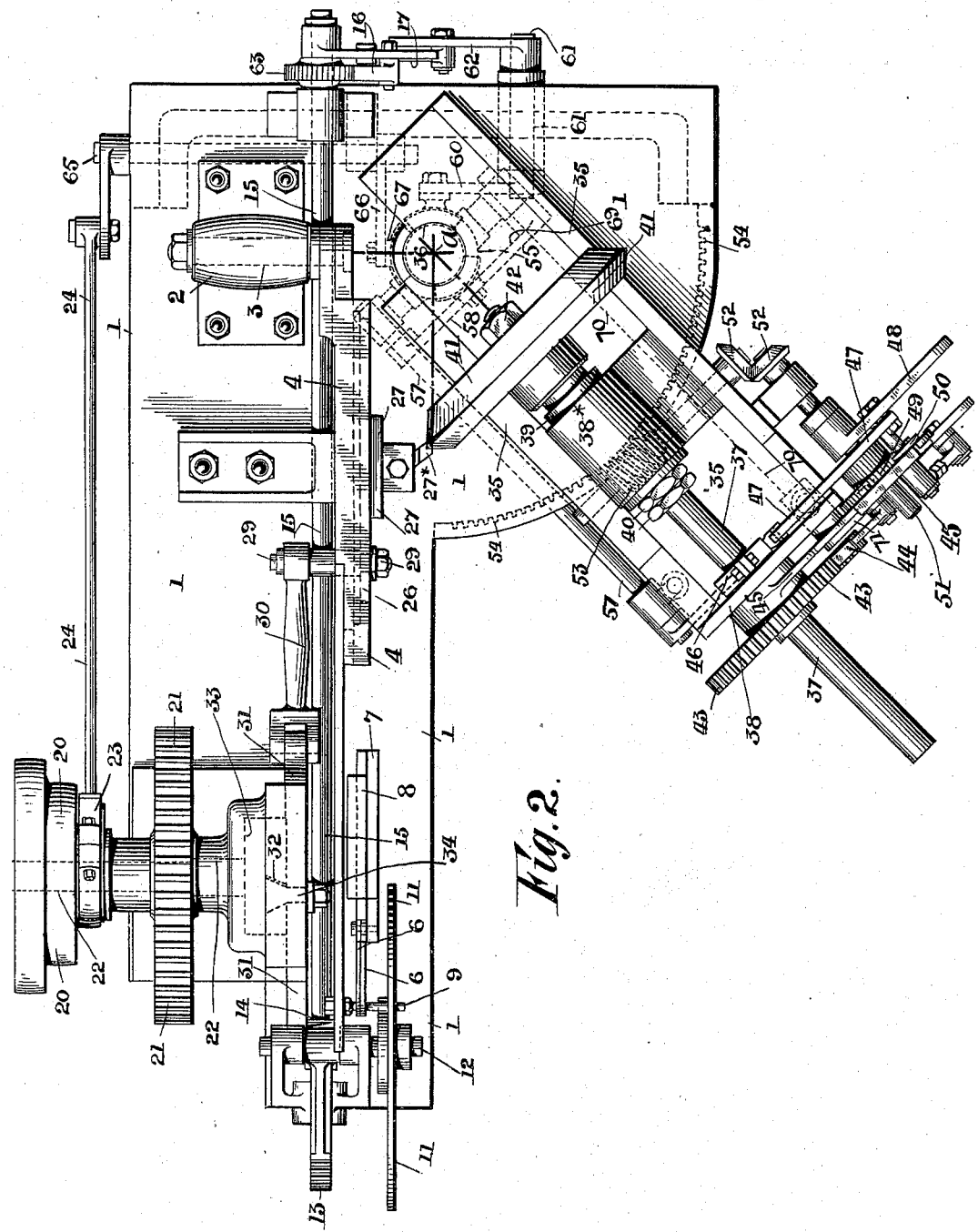

Figure 1 is an elevation of a machine in which the teeth of miter and bevel wheels can be cut; Fig. 2, a plan of same; Fig. 3, a front end elevation of the radial feeding-frame and appliances; Fig. 3ª, a sectional plan of feeding-lever; Fig. 4, a back end of fixed frame with gear for imparting intermittent motion for opening and closing grooved plates carrying the cutters; Fig. 5, an elevation of inclined grooved plates, showing toggle appliances for opening and closing them; Fig. 6, a detached elevation of one of the grooved plates, and Figs. 7 and 8 transverse sectional views of the cutter-carrier with sliding blocks.

1 is the main bed of machine, with column-bearer 2 for carrying axle or pivot pin 3 of the grooved plates 4 4, both of which are supported therefrom. The opposite ends of these plates 4 4 are slotted at 5 5 for affixing links 6 6 to suit the angle at which the two plates 4 4 shall be set in relation to each other, the two links 6 6 being connected at their opposite ends to a sliding plate 7, movable within a pillar 8, mounted upon the bed 1, and by which the open ends of the plates 4 4 are supported. The pins 9 9 of the plates 4 4 and the links 6 6 project outwardly, and are received in curved slots 10 10 of a disk 11, mounted on a quadrant carrying shaft 12, said quadrant 13 being in gear with the worm 14 of an intermittently-moving shaft 15, operated by the pawl 16 of an oscillating lever 17, as hereinafter explained.

The main driving-shaft 18 has a pinion 19 and the usual speed cone-pulley 20, said pinion 19 being in gear with the wheel 21, the shaft 22 of which has an eccentric 23 keyed to it for giving motion to a rod 24.

The plates 4 4 are slotted and grooved at 25 25 and serve to guide the cutting-tool slides 26 26, to which the holders 27 27 are affixed and adjustable in the slots 28 28 of the slides 26 26 for giving the to-and-fro travel which they perform under control of a couple of studs 29 29 and connecting-rods 30 30 from a strap-like block 31 in a V slot 32 of a disk 33, in which a crank-pin 34 is adjustably set for moving them and insuring the required travel to the slides 26 26 and tool-holders 27 27.

35 is a swivel-frame on the pin 36 for radial motion on the bed 1, said pin 36 being coincident with the pin 3, so that both pins 3 36 are in the same plane, so that if a line be struck through the centers of pins 3 36 and of the line of travel of the cutters 27* it would bisect a center line drawn through the shaft 37 at the point *a*. The shaft 37 is carried by supports 38 38*, within which is a mandrel-block 39, capable of being screwed up tight by the nuts 40 40 to fix the shaft 37 locally and according to the distance said shaft 37 is pushed in or drawn out, determined by the size and angle of the wheel to be cut. For large wheels the shaft 37 is drawn outwardly along with its bearing 38*, which is slidable on the frame 35, and for small wheels it is pushed inwardly, the wheel-blank 41 being secured to the shaft 37 by the pinch-nut 42.

The shaft 37 has a keyway along it, so that when rotated by the dividing-wheel 43 it moves a similar distance. This dividing-wheel 43 is operable by the pawl 44 of the lever 45, this being slotted for adjustment of the pawl 44 to suit the throw of the dividing-wheel 43 and shaft 37, according to the number of teeth required to be cut in the blank 41.

An eccentric 46 by the link 47 gives motion to a slotted lever 48, in which said link 47 can be adjusted for operating a ratchet-wheel 49 by the pawl 50, and this, through the spindle 51, gives rotation by bevel-gears 52 to a worm 53 in gear with a quadrant-rack 54, fixed just under the table of the bed 1. The eccentric 46 is also connected by rod 55 to lever 56, attached to one end of the rod 57, the other end of which has a similar lever 58 affixed and engaging with a collar-spool 59, mounted loosely on the pin 36 to slide up and down thereon to transfer the motion by lever 60 and shaft 61 and slotted bar 62 to the rod 17 for operating the pawl 16 and ratchet-wheel 63, into which the pawl 16 takes in order that the plates 4 4 may, through the curved slots 10 10 in the disk 11, close in gradually as the cutters proceed in their cutting action, the curvature of the slots 10 10 determining the shape of the tooth to be formed.

The spindle 51 has a square end for the reception of a winch-handle for first adjusting the radially-movable frame 35 to suit the angle of the face of the wheel-blank 41 placed on the shaft 37. When this adjustment is being performed, the pawl 50 is temporarily lifted out of contact with the ratchet-wheel 49.

The lower end of the rod 24, which gives motion to all the other operative parts except the sliders 26, is connected to a link 64 depending from a shaft 65, which, by a lever 66 and a block 67, retained within the rims of a sliding collar 68, imparts a lift motion to the collar, which motion is transferred to a lever 69 and thence, through the shaft 70 and lever 71, to the rod 72 for operating the push-pawl 44 and its lever 45.

The lever 45 is in a piece with a lever 73 at nearly right angles to it, to which an arm 74 is adjustably attached for it on the down-stroke of lever 45 to strike against and push a locking-pawl 75 out of the tooth of the dividing-wheel 43 in which it had been engaged. On the return stroke of the lever 45 the pawl 44 moves the wheel 43 forward and the lever 73 recedes from the locking-pawl 75 and allows it to rest upon the next blank space between the notches. By the continued movement of the lever 45 the wheel 43 will turn, the locking-pawl 75 engages in the next notch, but the lever 45 will travel still farther and the pawl 44 will slide in the slot against the compression of its spring 77, which will give out at the beginning of the downstroke of the lever 45, the wheel 43 being still held by the two pawls 44 75, the object of the sliding movement being to insure the wheel 43 being carried far enough.

The locking-pawl 75 is returnable by spring 76.

What I claim, and desire to secure by Letters Patent, is—

1. In a machine for cutting teeth in miter and bevel wheels, the combination with an automatically-movable support for the work to be operated upon, of a pair of guide-plates 4 arranged in a plane at right angles to the plane in which said work-support is moved, said guide-plates being each hinged or pivoted at one end and provided in the other end with slots 5, the disk 11 provided with slots 10, the sliding bar 7, the links 6 each having one end pivotally connected with said bar and their other ends provided with pins 9 engaged in said slots 5 and 10, and the two tools 27* 27* mounted to have a sliding radial movement in or upon the said guide-plates and arranged with their cutting-points directed always to the common center $a$ of the machine, substantially as described.

2. In a machine for cutting teeth in miter and bevel wheels, the combination with the table or bed 1, and the pivotally-supported guide-plates 4 automatically movable to and from each other and carrying the slidingly-operated tools 27* 27*, of the pivotally-operated frame 35 adjusted and operated in a plane at right angles to the plane in which said guide-plates are operated, an intermittingly rotary shaft 37 mounted upon said frame and adapted for support and holding of the wheel to be operated upon, the dividing-wheel 43 on said shaft, and the thrust-pawl 44 for imparting to said dividing-wheel, its shaft and the work thereon a partial rotation for each cut taken down a tooth of the miter or bevel wheel, substantially as described.

3. In a machine for cutting teeth in miter and bevel wheels, the combination of the longitudinally-grooved and slotted guide-plates 4 each hinged or pivoted at one end and provided with slots 5 in their tail ends, the disk 11 having slots 10, the links 6 provided with pins 9 engaged in the slots 5 and 10, the bar 7 to which said links are pivoted, and cutting-tools supported by and operated in said guide-plates, substantially as described.

4. In a machine for cutting teeth in miter and bevel wheels, the combination of the bed 1, the pin 36 having the loose collars 59 and 68 thereon, the pivotally-supported and radially-movable guide-plates 4, the slide-operated cutting-tools 27* 27* supported by said plates, the frame 35 pivoted on pin 36 and provided with segmental rack 54, the eccentric-actuated rod 24, the shaft 65 having arm 64 connected with said rod, lever 66 carried by said shaft and engaged with collar 68, shaft 70 having levers 69 and 71, the work-carrying shaft 37 mounted on the frame 35, dividing-wheel 43, pawl 44, lever 45, rod 72 for operating said lever 45 from the lever 71, eccentric 46 on shaft 37, the levers 47, 48, shaft 51, ratchet-wheel 49, pawl 50, worm-gear 53 engaged with segmental rack 54 and actuated from said shaft 51, rod 55, and the shaft 57 provided with arms 56 and 58, the latter being engaged with loose collar 59, substantially as described.

5. In a machine for cutting teeth in miter and bevel wheels, the combination of the guide-plates 4 pivotally supported at one end and provided with slots 5, cutting-tools supported by and operated in said plates, the shaft 12 provided with disk 11 having slots 10, the link 6, segment 13 on shaft 12, shaft 15 having worm-gear 14 and ratchet-wheel 63, shaft 22 carrying eccentric 23, the rod 24, shaft 65 having arm 64, shaft 61 provided with levers 60, 62, the rod 17 and pawl 16, substantially as described.

6. In a machine for cutting teeth in miter and bevel wheels, the combination of the pivoted frame 35, the work-carrying shaft 37 mounted on said frame and provided with dividing-wheel 43, eccentric 46 and means for clamping the work to be operated upon, the levers 47, 48, rack-and-worm gearing for the frame 35, pawl-and-ratchet mechanism intermediate said levers and worm-gearing, shaft 70 provided with slotted arm 71 the rod 72, lever 45 provided with pawl 44 to actuate the dividing-wheel and work-carrying shaft, the locking-pawl 75 and spring 76, and the lever 73 having arm 74, substantially as described.

7. In a machine for cutting teeth in miter and bevel wheels, the combination with the table or bed 1 and the pivotally-supported and automatically-adjustable frame 35 provided with means for supporting and holding the work, of the pair of pivotally-supported and longitudinally-slotted guide-plates 4 automatically movable to and from each other in a plane at right angles to the plane in which the said work-supporting devices are moved, the slides 26 supported in said guide-plates and provided with tool-holders, the slotted disk 33 provided with crank-pin 34, the strap-block 31 connected with said disk and crank-pin, and the connecting-rods 30 between said strap-block and slides, substantially as described.

In testimony whereof I have hereunto set my hand in presence of two subscribing witnesses.

JOHN BUCK.

Witnesses:
JOHN RICHARDSON,
JOHN WILLIAMSON.